US008600014B2

(12) United States Patent
D'Angelo et al.

(10) Patent No.: US 8,600,014 B2
(45) Date of Patent: *Dec. 3, 2013

(54) ENHANCING MESSAGING SERVICES USING TRANSLATION GATEWAYS

(75) Inventors: Leo A. D'Angelo, Lebanon, NH (US); Kamran Izadpanah, Pasadena, CA (US); John J. Bell, Anaheim, CA (US)

(73) Assignee: j2 Global Communications, Hollywood, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/463,153

(22) Filed: May 3, 2012

(65) Prior Publication Data

US 2012/0213348 A1 Aug. 23, 2012

Related U.S. Application Data

(63) Continuation of application No. 12/471,225, filed on May 22, 2009, now Pat. No. 8,175,229, which is a continuation of application No. 10/686,107, filed on Oct. 15, 2003, now Pat. No. 7,539,291.

(60) Provisional application No. 60/419,166, filed on Oct. 16, 2002.

(51) Int. Cl.
*H04M 11/00* (2006.01)

(52) U.S. Cl.
USPC .................................. 379/88.14; 379/93.06

(58) Field of Classification Search
USPC ............ 379/67.1, 88.12, 88.13, 88.14, 88.17, 379/100.01, 100.08, 100.09, 100.13, 93.06; 709/206; 370/352
See application file for complete search history.

(56) References Cited

U.S. PATENT DOCUMENTS

| | | | |
|---|---|---|---|
| 4,941,170 A | 7/1990 | Herbst | |
| 5,115,326 A | 5/1992 | Burgess et al. | |
| 5,193,110 A | 3/1993 | Jones et al. | |
| 5,333,266 A | 7/1994 | Boaz et al. | |
| 5,406,557 A | 4/1995 | Baudoin | |
| 5,479,411 A | 12/1995 | Klein | |
| 5,561,703 A | 10/1996 | Arledge et al. | |
| 5,568,536 A | 10/1996 | Tiller et al. | |
| 5,568,540 A | 10/1996 | Greco et al. | |
| 5,579,472 A | 11/1996 | Keyworth, II et al. | |
| 5,608,786 A | 3/1997 | Gordon | |

(Continued)

OTHER PUBLICATIONS

PCT International Search Report (dated Apr. 27, 2004), International Application No. PCT/US03/32945—International Filing Date Oct. 16, 2003, 6 pages.

(Continued)

*Primary Examiner* — Olisa Anwah
(74) *Attorney, Agent, or Firm* — Blakely, Sokoloff, Taylor & Zafman, LLP (57) ABSTRACT

In one embodiment, a translation gateway is for use between a network of a messaging service provider and a hostile data network. The gateway is to forward messages using a secure connection through the hostile network, to a customer's network. Different types of inbound messages (e.g., voice; fax) can be delivered to a single client process running on a customer machine on the customer network. In addition, the translation gateway may be used to securely forward different types of outbound messages originating from the client process to the service provider's network (where the messages are retransmitted as voice calls or facsimiles into a telephone network). Other embodiments are also described and claimed.

17 Claims, 8 Drawing Sheets

(56) References Cited

U.S. PATENT DOCUMENTS

| | | |
|---|---|---|
| 5,623,601 A | 4/1997 | Vu |
| 5,675,507 A | 10/1997 | Bobo, II |
| 5,765,033 A | 6/1998 | Miloslavsky |
| 5,870,454 A * | 2/1999 | Dahlen .................. 379/88.14 |
| 6,020,980 A | 2/2000 | Freeman |
| 6,061,448 A | 5/2000 | Smith et al. |
| 6,073,165 A | 6/2000 | Narasimhan et al. |
| 6,085,231 A * | 7/2000 | Agraharam et al. .......... 709/206 |
| 6,119,137 A | 9/2000 | Smith et al. |
| 6,151,675 A | 11/2000 | Smith |
| 6,192,407 B1 | 2/2001 | Smith et al. |
| 6,208,638 B1 | 3/2001 | Rieley et al. |
| 6,350,066 B1 | 2/2002 | Bobo, II |
| 6,385,655 B1 | 5/2002 | Smith et al. |
| 6,487,599 B1 | 11/2002 | Smith et al. |
| 6,502,191 B1 | 12/2002 | Smith et al. |
| 6,549,612 B2 * | 4/2003 | Gifford et al. .............. 379/67.1 |
| 6,564,321 B2 | 5/2003 | Bobo, II |
| 6,597,688 B2 | 7/2003 | Narasimhan et al. |
| 6,609,196 B1 | 8/2003 | Dickinson, III et al. |
| 6,625,258 B1 | 9/2003 | Ram et al. |
| 6,625,642 B1 | 9/2003 | Naylor et al. |
| 6,683,940 B2 | 1/2004 | Contractor |
| 6,693,893 B1 | 2/2004 | Ehlinger |
| 6,707,890 B1 | 3/2004 | Gao et al. |
| 6,707,891 B1 * | 3/2004 | Guedalia .................. 379/88.17 |
| 6,718,030 B1 | 4/2004 | Turner et al. |
| 6,741,705 B1 | 5/2004 | Nelson et al. |
| 6,751,298 B2 * | 6/2004 | Bhogal et al. ............. 379/88.13 |
| 6,981,023 B1 | 12/2005 | Hamilton et al. |
| 7,007,085 B1 | 2/2006 | Malik |
| 7,127,741 B2 | 10/2006 | Bandini et al. |
| 2002/0069062 A1 | 6/2002 | Hyde-Thomson et al. |
| 2002/0077082 A1 | 6/2002 | Cruickshank |
| 2002/0097850 A1 | 7/2002 | Schemers et al. |
| 2002/0124057 A1 | 9/2002 | Besprosvan |
| 2003/0099334 A1 | 5/2003 | Contractor |
| 2003/0152203 A1 | 8/2003 | Berger et al. |
| 2003/0202641 A1 | 10/2003 | Huang |
| 2004/0100648 A1 | 5/2004 | Kulakowski |
| 2005/0088977 A1 * | 4/2005 | Roch et al. .................... 370/254 |
| 2007/0124397 A1 | 5/2007 | Ruckart |
| 2007/0129060 A1 | 6/2007 | Jordan, Jr. |
| 2009/0052638 A1 | 2/2009 | Schroeder et al. |
| 2009/0182828 A1 | 7/2009 | Owens et al. |
| 2010/0122089 A1 | 5/2010 | Godfrey et al. |

OTHER PUBLICATIONS

Non-Final Office Action (dated Apr. 15, 2008), U.S. Appl. No. 10/686,107, Date filed Oct. 15, 2003, First Named Inventor: Leo A. D'Angelo, 24 pages.

Non-Final Office Action (dated Jul. 26, 2011), U.S. Appl. No. 12/471,225, Date filed—May 22, 2009, First Named Inventor: Leo A. D'Angelo, 19 pages.

"Tumbleweed Offers a Secure Transparent Email Solution", Tumbleweed Press Releases, Redwood City, CA, Mar. 21, 2001, Tumbleweed Communications Corp., Internet article at: http://www.tumbleweed.com/news/press_releases/2001/2001-03-21 . . ., 2 pages.

Final Office Action (dated Nov. 1, 2011), U.S. Appl. No. 12/471,225, Date filed—Oct. 15, 2003, First Named Inventor: Leo A. D'Angelo, 5 pages.

"Tumbleweed Unveils Integrated Messaging Exchange™ 4.0", Tumbleweed Press Releases, Los Angeles, CA, Apr. 5, 2000, Tumbleweed Communications Corp., Internet article at: http://www.tumbleweed.com/news/press_releases/2000/2000-04-05. . ., 2 pages.

* cited by examiner

FIG. 1

| Inbound telephone number | domain | username | Account status | Service Provider's translation gateway (IP addr on J2 network) | Customer's translation gateway (IP addr on hostile data network) |
|---|---|---|---|---|---|
| 1 310 123 0000 | CompanyA.com | Bill | Valid | 171.69.210.245 | 10.57.46.1 |
| 1 310 123 0002 | | Farzad | | | |
| 1 310 123 0003 | | John | | | |
| 1 818 512 1111 | CompanyB.com | Alice | Valid | 171.69.210.245 | 90.67.32.5 |
| 1 818 512 1121 | | Ben | | | |
| 1 818 512 1123 | | Chris | | | |
| 3393 200232 | CompanyC.com | Pierre | Valid | 171.69.271.62 | 24.32.13.8 |
| 3393 200234 | | Mimi | | | |
| 3393 200236 | | Natalie | | | |

ENHANCING MESSAGING SERVICES USING TRANSLATION GATEWAYS

This application is a continuation of Ser. No. 12/471,225, filed May 22, 2009, entitled "Enhancing Messaging Services Using Translation Gateways" (pending), which is a continuation of Ser. No. 10/686,107, filed Oct. 15, 2003, which issued as U.S. Pat. No. 7,539,291 on May 26, 2009, and which claims the benefit of the earlier U.S. filing date of Provisional Application No. 60/419,166, filed Oct. 16, 2002.

BACKGROUND

An embodiment of the invention relates to the field of messaging through circuit and packet data networks. Specifically, systems, methods and processes for identification, authentication, routing, delivery of electronic messages across one or more communication networks and transmission methods, are described here. These messages may be, but are not limited to, facsimile, voice messages, images, electronic documents, and software elements.

A provider of unified messaging services may have the following capabilities for servicing the messaging needs of its customers. First, each customer is assigned a unique telephone number. The customer can give this number to others; the others can then leave messages for the customer at that number (e.g., voice and facsimile messages). The way these messages are processed and stored may be as follows. A network of servers, which can be owned and/or managed by the service provider, is configured to capture an inbound message that has been transmitted to the customer's phone number over the public switched telephone network (PSTN). Once captured, typically in digital form, the message is then sent, as an attachment to an email message, to the customer's email address. This is the address of an email box that typically will have been previously established by the customer; the customer would have reported his email address to the service provider. The customer can now retrieve the messages, by accessing her email box, detaching and then viewing or playing back the attached messaged. This technique for unified messaging has a number of advantages for the customer, including a single interface for retrieving different types of messages, and a relatively inexpensive storage area for her messages.

The provider's server network can span different cities, states, and countries, so customers may be assigned telephone numbers over a wide geographical range. Thus, a customer living in New York City may request a telephone number that has a New York City area code. A server in that area code can then be configured to recognize incoming calls to that customer's telephone number, capture the inbound message and then address the message (via an email attachment, for example) to the customer's data network address. A central database managed by the service provider and accessible by all of the servers (in the service provider's network), can be used to associate each customer's phone number with his data network address and his message forwarding instructions (such as the file format of the email attachment). The server uses the database to determine where to route the message for a particular customer, i.e. which node of the provider's network can most cost efficiently forward the message, or which node has the needed resource to translate the message into a certain format required by the customer's machine.

BRIEF DESCRIPTION OF THE DRAWINGS

The invention is illustrated by way of example and not by way of limitation in the figures of the accompanying drawings in which like references indicate similar elements. It should be noted that references to "an" embodiment of the invention in this disclosure are not necessarily to the same embodiment, and they mean at least one.

DETAILED DESCRIPTION

Techniques are described for the communication of messages between a circuit switched network such as a telephone network and a packet switch network (also referred to as a data network). The transfer of messages is enhanced by using translation gateways at the edge of the data networks. The translation gateway may be designed to provide one or more translation functions that are performed upon messages, to for example provide security services between the sender and recipient over a hostile data network. In addition, the architecture involving translation gateways allows the environment or system as a whole to scale more easily as the number of subscribers or customers increase. Such subscribers and customers are those who are under contract with a service provider to pay for the security services used in delivery of their messages. Several embodiments of the invention are now described using voice mail and fax mail messages. However, the translation gateways as well as the methodology described here may be modified to work with other types of electronic messages.

Figure 1:
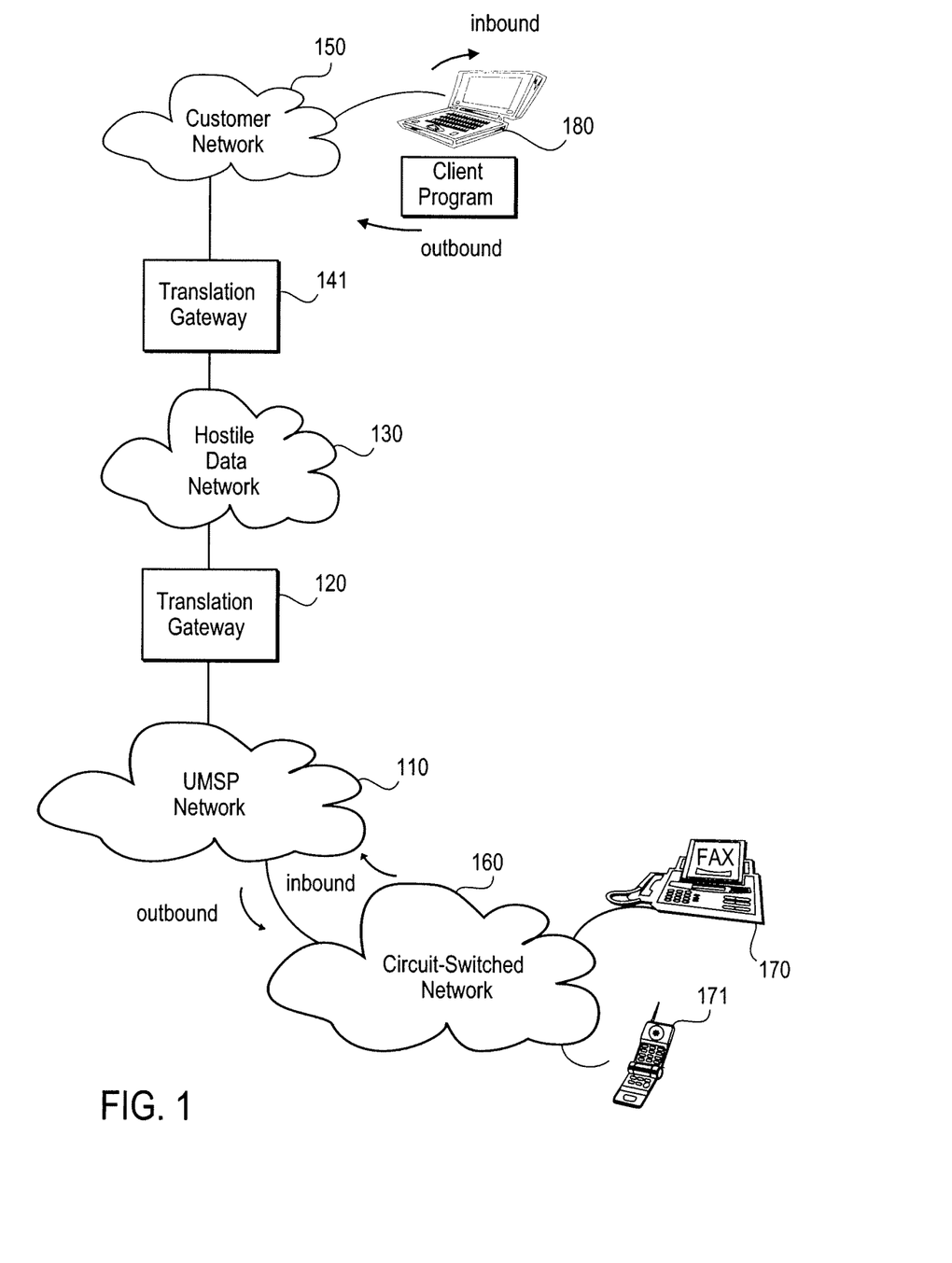
FIG. 1 illustrates a block diagram of a network environment in which a messaging service according to one or more embodiments of the invention may be implemented.

Beginning with FIG. 1, this figure illustrates a block diagram of a network environment in which a messaging service according to one or more embodiments of the invention may be implemented. The network environment is divided into several different networks. First, a unified messaging service provider (UMSP) network 110 is a data network of different types of resources that may be owned and administered by a service provider entity, such as the assignee of this application namely j2 Global Communications, Inc. of Hollywood, Calif. For example, the UMSP network 110 may be one in which Internet Protocol (IP) addresses for the nodes of the network are assigned by an administrator that is an employee of the service provider. In addition, the UMSP network 110 is a private network in that it has a security barrier against unauthorized access to its nodes and its content. The UMSP network 110 may also be viewed as a globally distributed interface to a circuit switched network 160 (also referred to as the public switched telephone network, PSTN, or telephony network). The UMSP network 110 has resources that can capture inbound messages that originate or pass through the circuit switched network 160, as well as transmit outbound messages through the circuit switched network 160. A source of the inbound message may be a conventional facsimile machine 170 or a computer (not shown) with facsimile capability, and any type of telephone unit 171. These devices may also be used as the ultimate recipient of outbound messages, for example via telephone calls dialed by a resource of the UMSP network 110.

The ultimate destination of an inbound message may be a client software program running in a notebook computer 180, where the client process and in this case notebook computer 180 are owned or administered by a subscriber or customer of the messaging service. This subscriber may be an individual, or it may be an organization such as a company that has paid the service provider for the messaging service to be used by a number of its employees or affiliates. In the embodiment shown in FIG. 1, the subscriber has or administers a customer network 150 which is a packet-switched or data network that may also be considered private in that unauthorized access to its nodes and content is prohibited. The customer network 150 may be as small as a single local area network (LAN) or it may be made of multiple networks connected to each other to form a wide area or enterprise network.

Putting the customer network 150 in communication with the UMSP network 110 is a hostile data network 130, such as the public Internet. Data network 130 is deemed hostile because messages that are transferred through that network are not guaranteed any form of privacy. Nevertheless, the data network 130 may be used as an efficient means for communicating messages between the customer network 150 and the UMSP network 110 over a wide geographic area, as described here.

At the edge of the customer network 150, and therefore considered to be a node of the customer network 150, is a translation gateway 141. In this embodiment, there is also another translation gateway 120 that is a node of and is on the edge of the UMSP network 110. Each of these translation gateways has a port (in, for example, an application layer or other layer above the network layer of the Open Systems Interconnect Reference Model data network communications protocol) that allows access to the hostile data network 130. Each gateway 120, 141 has certain translation functions that as described here enhance the messaging service provided to the subscribers. The translation gateway may thus be viewed as a protocol converter. An example of policy-based secure message delivery software that can be used to implement some of the functionality of the translation gateways 120, 141 is the MMS SECURE REDIRECT solution by Tumbleweed Communications, Corp., Redwood City, Calif.

The translation gateways 120, 141 are capable of sending and receiving inbound and outbound messages using standard network protocols, such as simple mail transfer protocols (SMTP) which is a protocol for sending email messages between servers. Email messages can then be retrieved with an email client program that uses either the post office protocol (POP) or Internet message access protocol (IMAP). Another communications protocol that may be used to transfer messages between a translation gateway and another node is web-based distributed authoring and versioning (Web-DAV) which is a platform independent extension to the hypertext transport protocol (HTTP) that allows users to collaboratively edit and manage files on remote web servers. Yet another communication protocol that may be used is the session initiated protocol (SIP) which is a signaling protocol for Internet conferencing, telephony, presence, events notification, and instant messaging. The protocol is used to initiate call setup, routing, authentication and other feature messages to end points within an IP domain.

A domain here refers to a group of computers or devices on a network that are administered as a unit, with common rules and procedures. Within the Internet for example, domains are defined by the IP address. All devices sharing a common part of the IP address are said to be in the same domain. A large or corporate customer may register one or more domains in its name.

A translation gateway in response to receiving a message on a given transport, performs a translation function based on a set of rules that are contained within the message body or are within a configuration script of the gateway itself. Possible translation functions include translation between protocols (for example from an SMTP format to an instant messaging format, and back), as well as privacy/security which is described below. The gateway translates the message to its intended format or otherwise applies the translation function to the message, and then resends the message to its ultimate recipient. Thus for example in FIG. 1, a fax message that has been transmitted by the fax machine 170 is captured by an inbound resource of the UMSP network 110. This was preceded by a telephone call made by the fax machine 170 using the circuit switched network 160, to an inbound telephone number that has been assigned, by the UMSP network administrator or another UMSP agent, to a particular subscriber. This inbound telephone number is used by the subscriber to receive telephone fax or voice mail messages (or both). The UMSP network 110 may allow the subscriber to customize for example an outgoing message that is played back in response to an incoming call.

Once captured, the inbound message is routed through the UMSP network 110 to the appropriate translation gateway 120. Thus, for example, if the inbound message is on behalf of a particular corporate subscriber, the message is routed to the translation gateway 120 that has been assigned for handling message traffic for that subscriber. See, for example, the look-up table shown in FIG. 2. For simplicity, other translation gateways are not shown in FIG. 1 but may of course be present depending upon how many subscribers the service has and the amount of expected message traffic. The architecture may thus be scaled relatively easily, by simply adding additional translation gateways as the number of subscribers or messages increase. Note also that the message may be converted for example from a fax protocol format into a digital format such as TIFF or PDF, prior to being delivered to the translation gateway 120.

Figure 2:
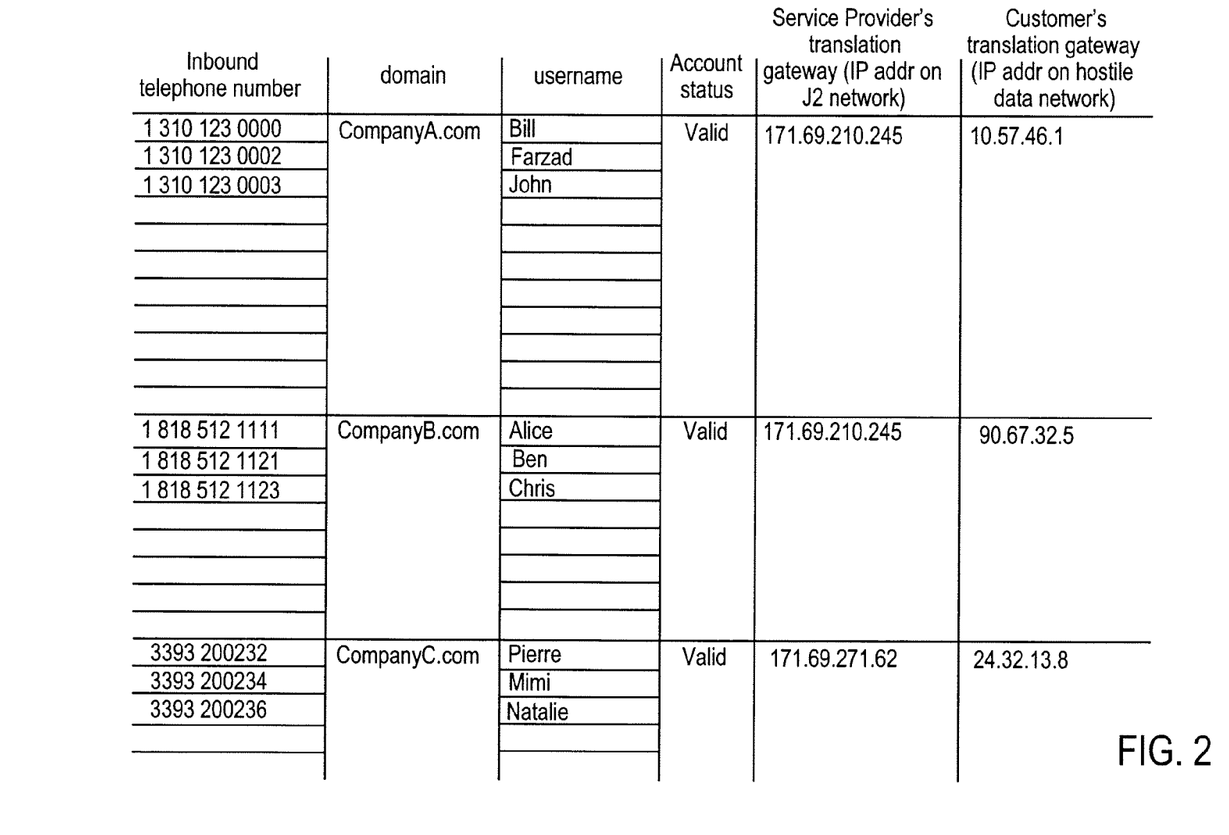
FIG. 2 illustrates a table of information that may be used by a translation gateway, for routing inbound messages to corporate subscribers.

Upon receiving the inbound message, the translation gateway 120 determines which address to forward the message, using for instance a lookup table such as the one illustrated in FIG. 2. The example in FIG. 2 shows that a set of inbound telephone numbers that has been assigned to the subscriber company A is associated with the domain name companyA.com. There may be a different individual user associated with each telephone number as shown, so that a complete address may be defined as the combination username@companyA.com. Such detailed information about the identity of the individual users or their complete, individual addresses, however, need not be present in the translation gateway or in the UMSP network in general, in order for the gateway 120 to do its job of forwarding the messages to the customer network 150 (see FIG. 1). The service may thus be operated on a per domain basis, with all inbound messages that arrive on the inbound telephone numbers of a given customer (as determined by the lookup table in FIG. 2, for example) being pushed to the corresponding customer's translation gateway network address. It will then be up to the translation gateway 141 to match the correct email address (or other data network address on the customer network 150) to each inbound message, using for instance, the inbound telephone number as an index to a look-up table.

At the translation gateway 120, forwarding is achieved by for example attaching the message to an email that is addressed to a subscriber's predefined email address (e.g., smtp@companyA.com) that has been assigned to the translation gateway 141. The message traverses the hostile data network 130 on its way to the translation gateway 141. Accordingly, an embodiment of the invention is directed to providing the inbound message with privacy as it traverses this hostile data network. This security feature may be provided in different ways, for example either through a secure connection such as a virtual private network tunnel (see FIGS. 3A and 3B described below) or encryption on a per message basis such as using the Secure Multipurpose Internet Mail Extensions (S-MIME) protocol (FIGS. 4A and 4B) or using SMTP over Secure Sockets Layer (SSL) which runs "on top of" TCP/IP, i.e. uses TCP/IP to support application tasks such as displaying web pages or running email servers (see FIG. 5).

Returning to FIG. 1, as inbound messages are received over the hostile data network 130 at the translation gateway 141, they may be forwarded to an email server for storage (not shown) from which they can be accessed by a client program running in the notebook computer 180 and which has been configured (with a security certificate that allows access to its user's email box) by an administrator of the customer network. As mentioned above, this client program may alternatively be running in other types of devices, such as a desktop computer, a personal digital assistant (PDA), a mobile phone unit (not shown) or any type of networked electronic appliance.

Another embodiment of the invention lies in an outbound service provided to subscribers of the UMSP. The outbound service may be implemented as follows. As part of its contract for secure messaging services, the subscriber is informed, by the service provider, of a domain name such as secure.outboundservice.com which represents a domain of outbound resources in the UMSP network 110 that is owned or administered by the service provider. In the embodiment of FIG. 1, it is the same translation gateway 120 used for inbound services that is assigned the domain name for outbound service. A client program, such as an email client of the subscriber, may then send an outbound message, in the form of an attachment for example, that is addressed to the domain name. For fax and voice messages in particular, the service provider further instructs the subscriber to add the destination, circuit switched network address (e.g., telephone number) as a prefix (e.g., 13108205988@secure.outboundservice.com) prior to sending the outbound message. This prefix will then be interpreted by the translation gateway 120, to determine the appropriate outbound resource within the UMSP network 110 that will be able to forward the message to its ultimate destination, namely the indicated telephone number.

The outbound message is first delivered to the translation gateway 141 via email through the customer network 150. This getaway 141 then determines, through for example a lookup table (not shown), the data network address of the translation gateway 120 belonging to the service provider. In other words, the translation gateway 141 recognizes the mapping between the domain name in the address of the email message and, for example, an IP address of the service provider's translation gateway 120. The message, and in particular the attachment in the case of email, is then sent through the hostile data network 130 while maintaining privacy, and arrives at the translation gateway 120. There, after verifying that the message is from a current subscriber (by, for example, analyzing the "from" field of the email), the translation gateway 120 may determine what is the most efficient manner of delivering the message to its intended recipient. For example, if the message is intended to be delivered to a facsimile number, then an outbound resource that has a fax telephoning card may be designated to receive the message. If the message is a voice message that is for example an audio or video recording, then a audio or video telephoning card that can relay such a message to the intended recipient is designated to receive the message. Alternatively, the message may be placed into a queue from which messages are pulled, according to their types, by the various outbound resources as these become available to transmit. The message then may be routed through the UMSP network 110 which, as mentioned above, may be a globally distributed network. Thus for example the translation gateway 120 may be located in one country but the outbound resource which places the phone call, for example to transmit the fax or play back the voice message, or otherwise transmits the outbound message, is located in another country.

Figure 3A:
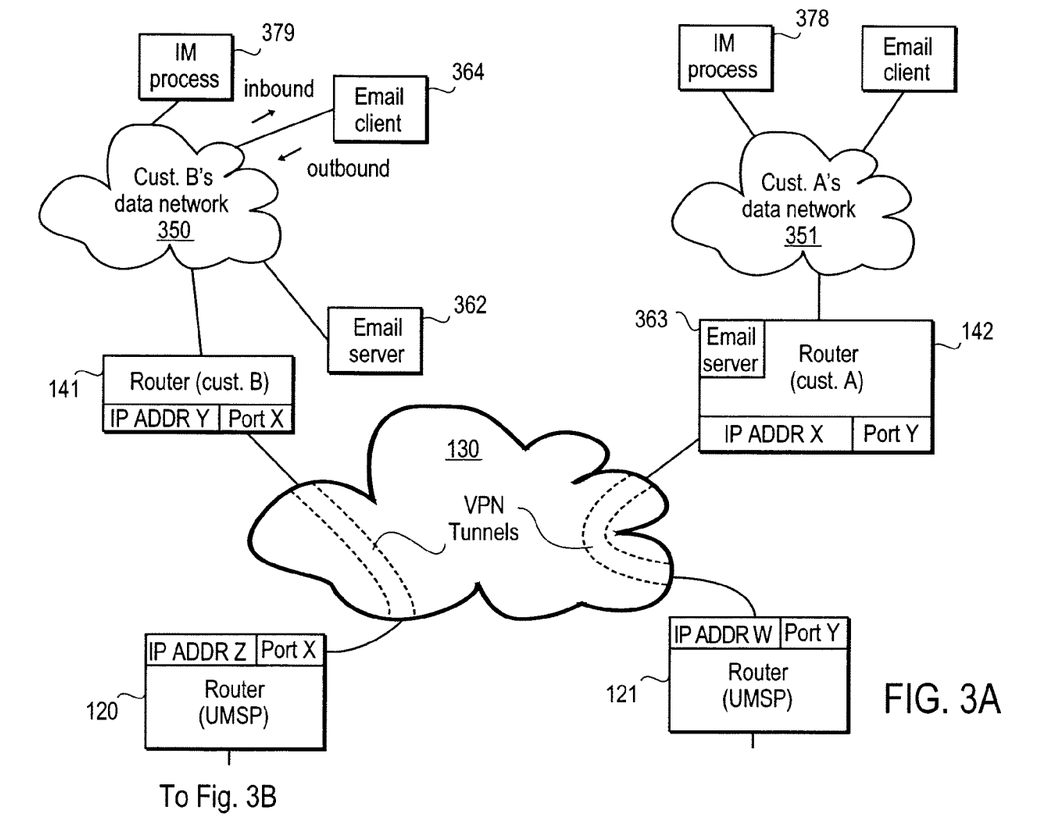
FIGS. 3A and 3B depict a network environment where the messaging service provides security services on a per connection basis.
Figure 3B:
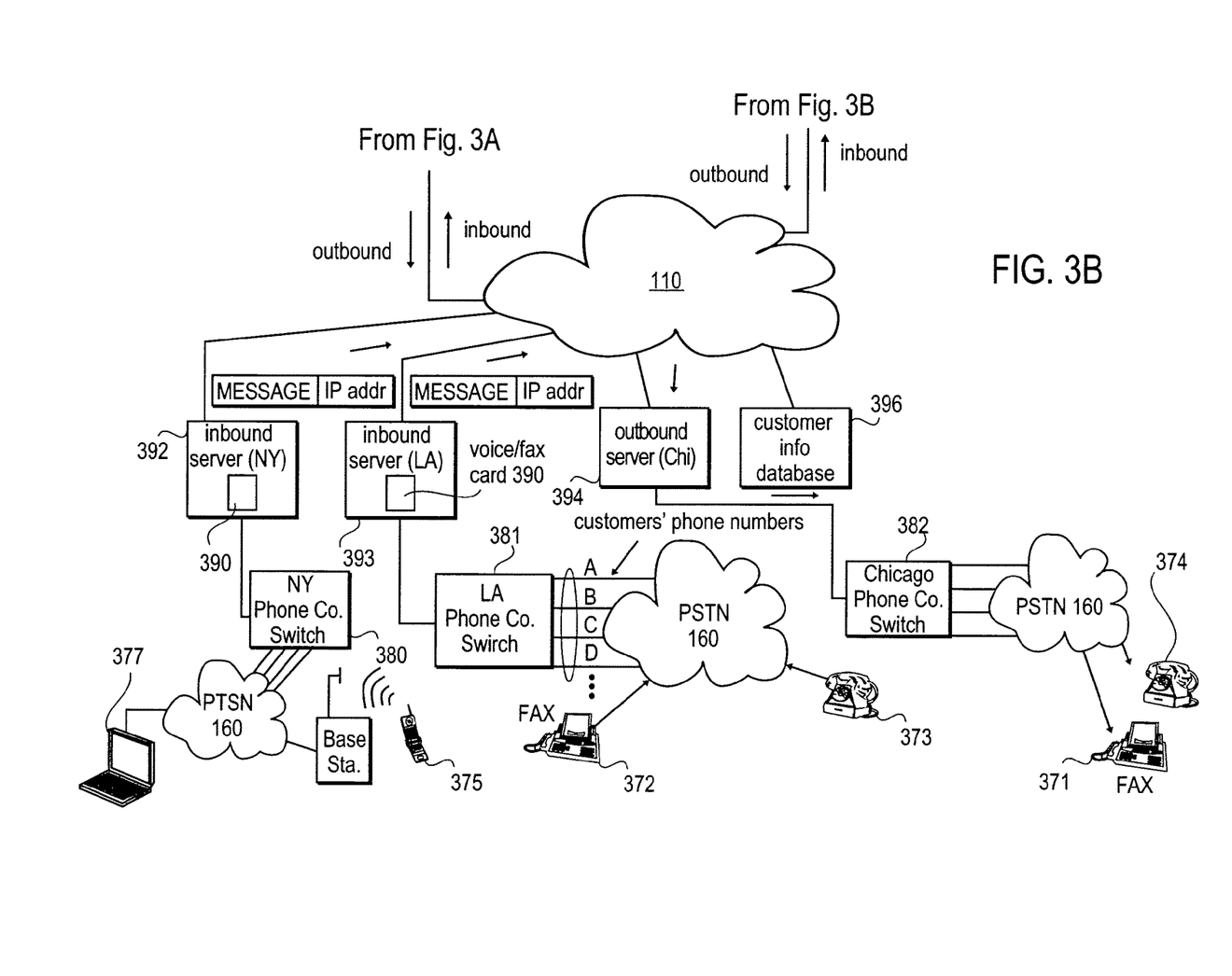

Turning now to FIGS. 3A and 3B, what is shown is a network environment where the messaging service provides security services on a per connection basis. In this embodiment, a virtual private network (VPN) tunnel is established between predefined ports of the translation gateway 120 and translation gateway 141, for customer B. The VPN tunnel at port X of gateway 120 may be viewed as an extension of customer B's data network 350, while the one at port Y of gateway 121 is an extension of customer A's data network 351. In this embodiment, the gateways actually may be implemented as routers, where the gateways 120 and 141 feature routers that are preferably both administered by customer B, while those in gateways 121, 142 are administered by in this case customer A. Additional VPN tunnels may be established for the benefit of another corporate or institutional subscriber. Data traffic through the VPN tunnels is secure in that as messages are traversing through the data network 130 their privacy, as well as other security features such as integrity, are maintained in the face of attacks. The VPN tunnels may be used for both inbound and outbound messages.

Note that each of the routers shown in FIG. 3A has a unique IP address on the hostile data network 130. After a port is negotiated between two routers, the two routers form a virtual private network with the ability to communicate messages securely between them, over the hostile data network 130. It should be noted again that the gateway 141 (router for customer B) is a node of customer B's data network 350, but not of the UMSP network 110 (see FIG. 3B). Similarly, the router in the translation gateway 142 is a node of customer A's data network 351, but not the UMSP network 110. At the other end of the hostile data network 130, the routers in both gateways 120, 121 are different nodes of both the hostile data network 130 and the UMSP network 110, but not of either customer A's data network 350 or customer B's data network 351.

As was mentioned above, the messaging service may provide the ability to forward both inbound and outbound messages for its subscribers. As another example, FIG. 3B shows a number of devices that can source inbound messages, and receive outbound messages. These devices include a conventional facsimile machine 371, 372, a landline telephone unit 373, 374, a cellular mobile unit 375, and a desktop or notebook computer 377. In this embodiment, all of these devices communicate through the circuit switched network (PSTN) 160. The service provider may contract with local phone companies to lease a number of telephone lines of the circuit switched network 160. Thus, in the example shown in FIG. 3B, there are lines leased in New York, Los Angeles, and Chicago. These lines connect the circuit switched network 160 to local phone company switches 380-382. The switches 380-382 are communicatively coupled to notify one or more voice/fax cards 390, that are in respective inbound and outbound servers 392-394, that there is an incoming call to a given inbound address (e.g., telephone number) assigned to a line leased by the service provider. The servers 392-394 are respective nodes of the UMSP network 110.

A customer information database 396 may also be provided as part of the UMSP network 110, as a central storage for customer account information. Such customer account information would include for example the information shown in the table of FIG. 2. In addition, translation options if any for each subscriber may also be included in this database. This database 396 may also be accessed by the translation gateway 120, to determine which translation functions need to be applied to the messages of a particular subscriber. For example, certain messages may need to be translated from one protocol to another, or from one format to another, prior to being forwarded. Thus, the database 396 may indicate that facsimile messages should be translated into an instant messaging (IM) format for use by a particular client (IM) process 379 (see FIG. 3A), rather than by an email client 364. Other customer-specified translation and filtering rules may also be stored in the database 396. Of course, portions of the database 396 may be copied to other elements of the UMSP network within local, cache-type storage units (not shown).

Still referring to FIG. 3A, note that the translation gateway 141 for customer B is configured in this embodiment to recognize that different types of inbound messages through its port X may need to be processed differently. For example, email messages would be forwarded to email server 362 (which may be a separate node of customer B's data network 350), while other types of messages such as instant messaging (IM) would be forwarded to an IM storage area or directly to the client process 379 if the IM client is on line. Other forms of groupware may also be supported by the translation gateway 141, to deliver inbound messages to a predefined client process, or receive outbound messages from certain client processes.

It should be noted that the above-described embodiments of the messaging service are a for-profit service for which subscribers have agreed to pay on a monthly basis, or some other interval for billing. These secure services may be offered to the subscribers at an additional premium, above a basic set of unified messaging services in which inbound and/or outbound messages are delivered for the subscriber without guaranteeing their privacy or integrity as they traverse a hostile data network. The service provider may provide the subscriber a report or bill for example on a monthly basis that details the charges incurred by the subscriber including the type of service used and how it was used as well as how often it was used.

Figure 4A:
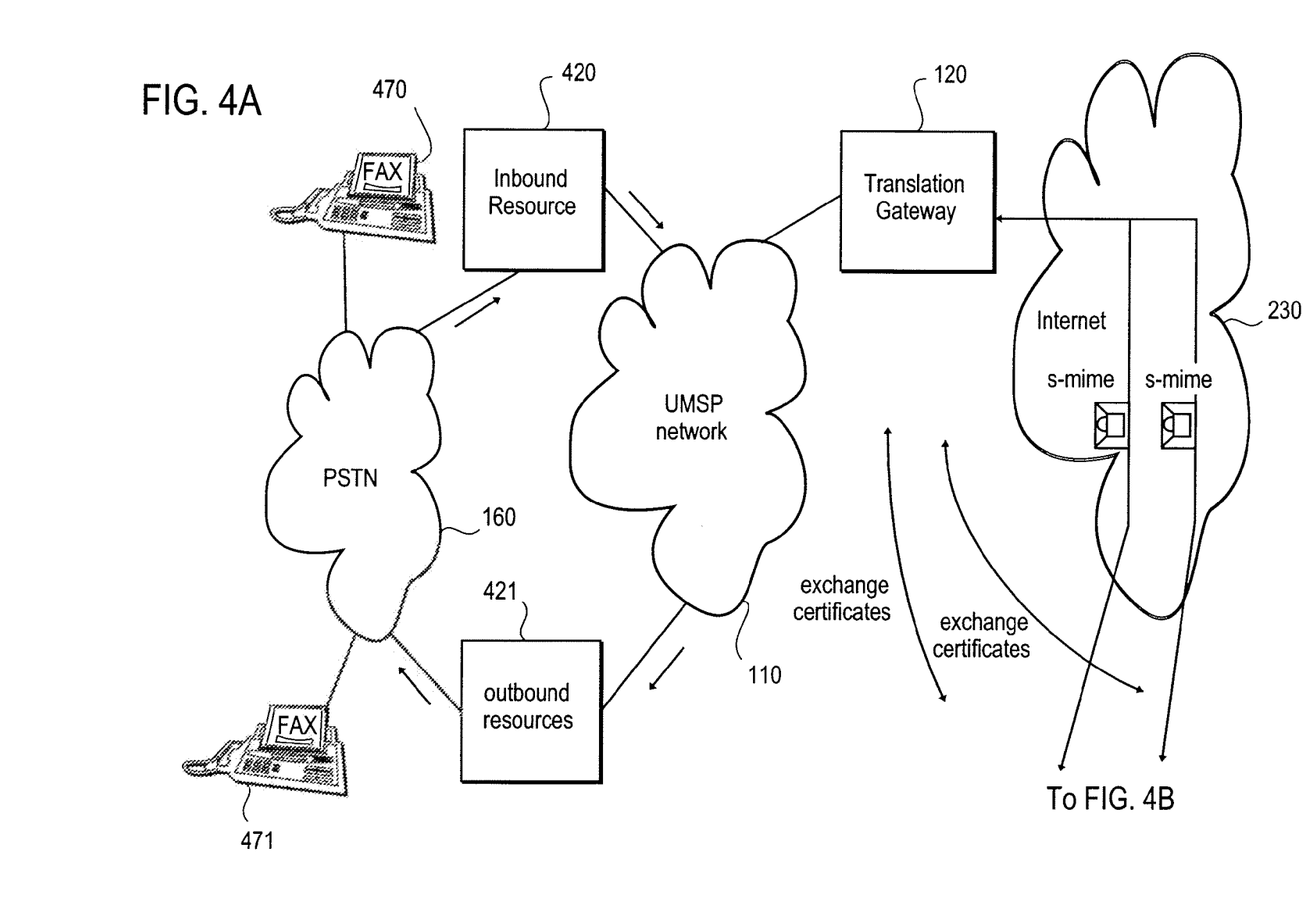
FIGS. 4A and 4B show an environment where the messaging service provides security services in the form of encryption on a per message basis.
Figure 4B:
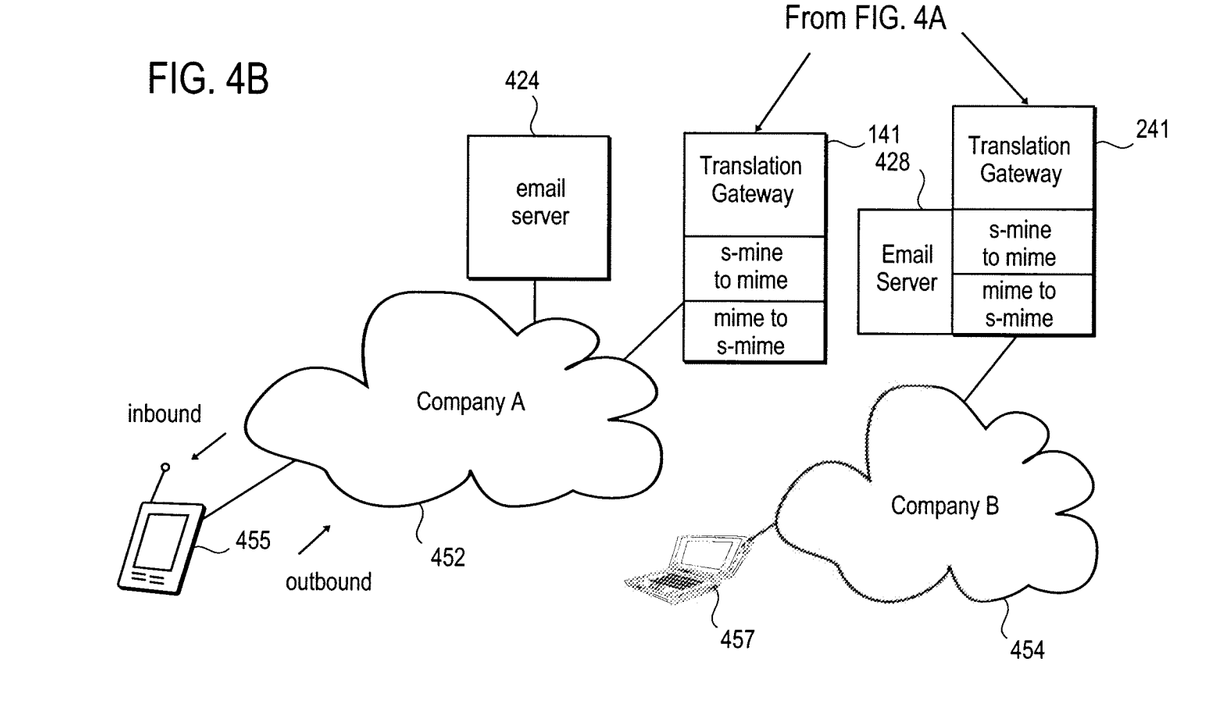

Turning now to FIGS. 4A and 4B, these show a network environment where inbound messages are delivered securely to corporate subscribers company A and company B using encryption on a per-message basis. In this embodiment, the translation gateway 120 has a security function that when applied precludes unauthorized access to the content of inbound messages as these are forwarded by the translation gateway 120 through the hostile data network, in this case being the Internet 230, to either translation gateway 141 or 241 (see FIG. 4B). Thus, the same translation gateway 120 may be used to apply a security function to messages on behalf of more than one corporate subscriber. The security function in this embodiment is to translate the inbound messages that have been captured by an inbound resource 420 (and which may originate from a conventional fax machine 470) into S-MIME format, and address these encrypted messages to the domain name of the respective customer A or B (previously assigned to the translation gateway 141 or 241). When these encrypted messages are received by the translation gateway 141 or 241, they may be converted into MIME in this embodiment, and then handed off to an email server that is on the data network 452 (and administered by company A), or that is on the data network 454 (administered by company B). These email messages may then be accessed by authorized client processes that are running in for example a personal digital assistant (PDA) 455 or a notebook computer 457, over their respective data networks 452, 454.

The same translation gateways 141, 241 used for inbound service may also be used for outbound service. A security function may be added by which an outbound email message (sourced from for example the PDA 455 or notebook computer 457) is translated from MIME to S-MIME, after being pulled from the respective email servers 424, 428. For example, all email messages addressed to the domain secure.outboundservice.com are pulled from the email server and following the conversion to S-MIME are forwarded through the Internet 230 to the translation gateway 120 (which is assigned to receive all messages addressed to that domain). The translation gateway 120 and the translation gateways 141, 241 had previously exchanged security certificate keys for implementing the S-MIME protocol, to ensure privacy on a per message encryption basis through the Internet 230. For example, a single set of security certificate keys may be exchanged that is applied by the gateway 141 or 241, to encrypt all of its outbound messages addressed to the service provider's domain at secure.outboundservice.com. Note that while the gateway 120 is administered by the service provider, the gateways 141, 241 are preferably administered by the respective subscribers, company A and company B.

At the translation gateway 120, as the outbound messages are received in S-MIME format, they are verified as being from a current subscriber (e.g., by checking the "from" field in the case of an email message), and are then decrypted and routed to the appropriate outbound resource 421, in the UMSP network 110 (see FIG. 4A). Again, as an example, if the outbound message is an email message that has a facsimile attachment (e.g., a word processor file or an image file) and is addressed to 13108205988@secure.outboundservice.com, then a routing function in the UMSP network 110 will recognize that the outbound resource 421 has a fax transmission card located in the 310-area code, such that the attachment can be transmitted relatively cheaply as a local, facsimile protocol call made from that fax card to the given number identified in the prefix of the email address.

Another embodiment of the invention bypasses or avoids the need for a translation gateway 141 that is on the customer network 452 (see FIG. 4B). In that case, the translation gateway 120 would still perform the conversion to S/MIME (for inbound messages) and from S/MIME (for outbound messages), for transmission across the Internet 230 of messages on behalf of company A. However, in the inbound case, the S/MIME message is delivered directly to the email server 424 on customer network 452, and then it is the customer's email client software running in the PDA 455 which provides the decryption functionality required for the customer to read the message. In that case, every user or affiliate of company A, on the customer network 452, may be required to obtain a secure certificate, exchange the certificate with the UMSP network 110 and configure their e-mail client to utilize this certificate for reading encrypted messages. The administrative overhead to provide such functionality may be so great for a medium to large customer network (where there are a large number of affiliates that will use the secure messaging service) as to justify the alternative solution of the translation gateway 141.

Utilizing a translation gateway to provide enhanced messaging functionality may benefit the unified messaging service provider, in the following ways. A large, distributed UMSP network 110 may consist of hundreds if not thousands of devices distributed globally, some for capturing inbound messages (such as voice and facsimile over the PSTN) and others for transmitting outbound messages (again, such as facsimile and voice over the PSTN). By utilizing the translation gateway 120 to provide the translation functions that are applied to inbound and/or outbound messages, additional functionality can be centralized within the UMSP network 110 rather than distributed to every device within the network. This allows the service provider to provide enhanced functionality quickly and cost effectively without requiring a "fork lift upgrade" to the UMSP network 110.

Figure 5:
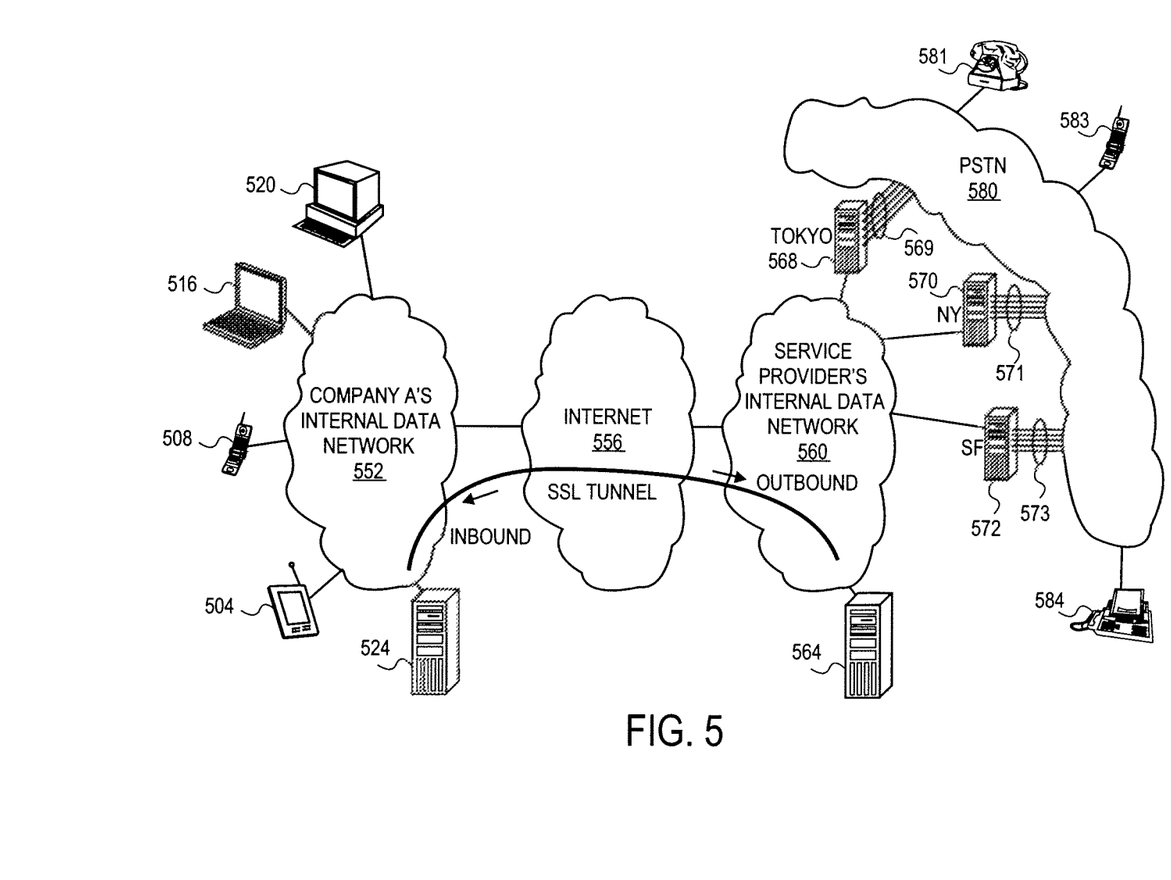
FIG. 5 illustrates a block diagram of an environment for implementing a secure messaging service, using SMTP over SSL.

Referring now to FIG. 5, a block diagram of another environment for implementing a secure messaging service is illustrated. In this embodiment, the higher level, data communications protocol used to securely send inbound and outbound messages through the Internet 556 is referred to as a SSL tunnel that connects an email server 524 in company A's internal data network 552, to an email server 564 in the service provider's internal data network 560. The email servers 524, 564 are administered by company A and the service provider, respectively. The inbound and outbound messages are in this embodiment email messages that may be formed in accordance with SMTP and communicated through the Internet 556 "on top of" SSL. This SSL tunnel is implemented by software that allows the encryption of arbitrary TCP connections inside SSL. Thus, the SSL tunnel application may allow one to secure non-SSL aware daemons and protocols (like POP, IMAP, LDAP, etc.) by having SSL tunnel provide the encryption, without requiring changes to the daemon's code.

In operation, the SSL tunnel is a transient connection that is created when, for example, in the case of an inbound message, the service provider's email server 564 has received an inbound message (including, for example, a facsimile or voice file attachment) that is addressed to the domain of company A. The SSL tunnel application (which may be running in the email server 564) recognizes that the company A domain is handled by company A's email server 524, and on that basis creates the SSL tunnel by exchanging security information with the email server 524. Of course, a corresponding SSL tunnel application is running in the company A domain, and in particular in the email server 524, so as to complete the negotiation of security information. Once the secure connection has been established, the inbound message, under control of for instance SMTP, is handed to the SSL tunnel program which then "wraps" the inbound message and sends the message through the SSL tunnel to the email server 524. At the email server 524, the SSL wrapper is undone and the message is handed up to the SMTP software component, where the latter makes the inbound message available for access by a client process in company A's internal data network 552. As mentioned above, this inbound message within the email server 524 may now be accessed through a variety of different client processes that may be running in, for example, a PDA 504, a mobile phone unit 508 (with data or text capability, in addition to voice, and the further capability of accessing the internal data network 552 through a wireless data connection), a notebook computer 516, or a desk top computer 520. Such a secure transfer of the inbound message from the service provider's network 560 to a subscriber's network is seamless to the client process.

Similarly, for outbound messages, as these are collected in the email server 524 of company A's internal data network 552, a SSL tunnel application that may be running in the email server 524 obtains knowledge of these outbound messages that may have been enqueued, and selects one (addressed to the service provider's domain). An SSL wrapper is then applied to the selected outbound message and a SSL tunnel is negotiated with the email server 564 in the service provider's domain. After the outbound message securely arrives at the service provider's domain, the SSL wrapper is undone and the outbound message is enqueued in the email server 564. Software (that may be also running in the email server 564) detects that the outbound message is from company A's domain, and accordingly verifies (through some customer information database, not shown) that the account of company A is current. The outbound message may then be transferred, still using SMTP for example, to any one of the outbound resources 568, 570, and 572 for instance, depending upon which can most efficiently forward the outbound message into the PSTN 580. Following a translation into a format suitable for communication over the PSTN 580, the outbound message is transmitted through any one of telecommunication lines 569, 571, and 573, after having invoked the circuit switch network address of the recipient's receiver, e.g. a landline telephone 581, a mobile phone 583, or a fax machine 584. Again, the secure sending of outbound messages from the subscriber's network to that of the service provider is seamless to the subscriber's client process from which the message originated.

Using the SSL tunnel application, as described above, may also obviate the need for more expensive and more complex software that supports VPN tunnels (FIG. 3A), or an S-MIME connection (FIG. 4A). Of course, additional software that provides billing information to the customer, including identifying the inbound and outbound messages that were successfully transferred, as well as the total cost to the customer for such services, may also be needed to run in the service provider's internal data network 560, but is not explicitly shown.

Figure 6:
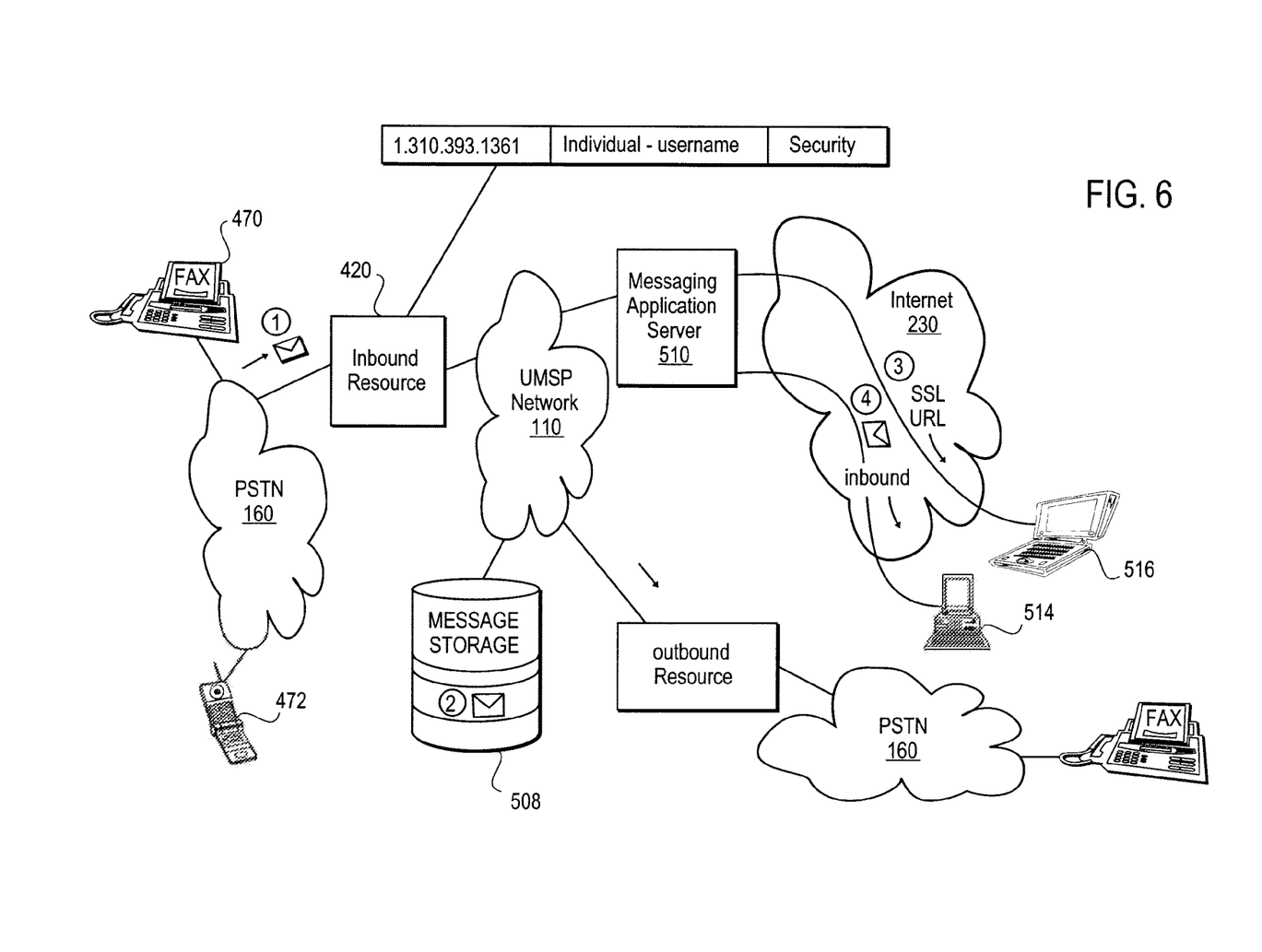
FIG. 6 is a block diagram of an environment for implementing a secure messaging service suitable for individual subscribers.

Turning now to FIG. 6, this figure is a block diagram of an environment for implementing a secure messaging service that may be particularly suitable for individual subscribers. In this embodiment, inbound messages are provided with privacy as they traverse the Internet 230, as follows. First, the messages are captured by an inbound resource 420, similar to the situation in FIG. 4A. The inbound message may originate as an incoming telephoning call made from either a facsimile machine 470 or a telephone unit 472 to the inbound circuit-switched address (here, telephone number) assigned to the subscriber. After the message has been processed into the desired digital format, the inbound message is stored in a message storage server 508 on behalf of the subscriber. The storage server 508 may be a separate node of the UMSP network 110. Next, a messaging application server 510, which is also another node of the UMSP network 110, obtains knowledge of the stored message and will then send a resource locator link (such as Universal Resource Locator, URL) over a hostile data network such as the Internet 230, to a client process actually being used by, or to be used by, a subscriber of the secure messaging service. The messaging application server 510 may be implemented as a modified version of the secure message delivery technology referred to as IME by Tumbleweed Communications, Corp., Redwood City, Calif. The client process may be a client program (e.g., email; instant messaging) running in once again for example a desktop computer 514, a notebook computer 516, or other networked data device. The subscriber may then be instructed by the service provider (e.g., via a text prompt that accompanied the link) to invoke this link so as to establish a connection with the UMSP network 110 (and in this embodiment, the messaging application server 510) to securely receive the stored inbound message. The connection may be, for example, a Secure Socket Layer (SSL) connection over which all data being transferred over the Internet 230 to the client process is encrypted for maintaining privacy. Using such a technique, the subscriber may be prompted to login to a secure web site after having invoked its SSL URL, with a password known only to the subscriber and that was previously assigned by the service provider, so that only the subscriber can login to retrieve her inbound messages. In such an embodiment, there is no need for the client process and the messaging application server 510 to exchange security certificates in order to deliver inbound messages to the subscriber.

It will be appreciated by those skilled in the art that the block diagrams herein represent conceptual views of illustrative circuitry and/or software embodying the principles of the invention. Similarly, it will be appreciated that any flow charts, flow diagrams, pseudocode and the like represent various processes which may be substantially represented in computer readable medium and so executed by a computer or processor, whether or not explicitly shown.

The functions of the various elements shown in the figures, including functional blocks labeled as "processors" or "servers" may be provided through the use of dedicated hardware as well as hardware capable of executing software in association with appropriate software. When provided by a processor, server or computer, the functions may be provided by a single dedicated processor, by a single shared processor, or by a plurality of individual processors, some of which may be shared. Moreover, explicit use of the term "processor", "server", or "computer" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware and/or software, standard and/or custom, may also be included.

To summarize, various embodiments of providing enhanced messaging services using translation gateways have been described. In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A system for supporting a messaging service, comprising:
    a computer server coupled with a circuit switched network to receive an inbound message from the circuit switched network, to apply a translation function to the inbound message, and to transmit the translated inbound message to a message storage server;
    the message storage server to receive and store the translated inbound message; and
    a messaging application server to obtain a location of where the translated inbound message is stored, to transmit a resource locator link over a hostile packet switched network to a customer computer, and to establish a virtual private network (VPN) tunnel between the messaging application server and the customer computer over the hostile packet switched network, in response to the customer computer invoking the resource locator link so that the customer computer can securely receive the translated inbound message through the VPN tunnel.

2. The system of claim 1, wherein the resource locator link includes the location of where the translated inbound message is stored so that the customer computer can securely retrieve the translated inbound message through the VPN tunnel.

3. The system of claim 1, wherein the resource locator link is a universal resource locator (URL).

4. The system of claim 1, wherein the hostile packet switched network is the Internet.

5. The system of claim 1, wherein the inbound message is a facsimile message.

6. The system of claim 1, wherein the inbound message is a voice message.

7. A method for providing a secure messaging service, comprising:
    assigning a separate set of one or more circuit switched network addresses to each of a plurality of corporate customers of the messaging service;
    associating the set of circuit switched network addresses for each customer with an internet domain of the customer;
    receiving an inbound message that is addressed to one of the set of circuit switched network addresses of a given customer;
    applying a translation function to the inbound message;
    storing the translated inbound message;
    transmitting a resource locator link, including a location of where the translated inbound message is stored, over a hostile packet switched network to an internet domain of the given customer;
    establishing a virtual private network (VPN) tunnel with the given customer in response to an invocation of the resource locator link by the given customer; and
    transmitting the translated inbound message over the hostile packet switched network through the established VPN tunnel.

8. The method of claim 7, wherein the resource locator link is a universal resource locator (URL).

9. The method of claim 7, wherein the hostile packet switched network is the Internet.

10. The method of claim 7, wherein the inbound message is a facsimile message.

11. The method of claim 7, wherein the inbound message is a voice message.

12. The system of claim 2 wherein the hostile packet switched network is the Internet and the inbound message is a facsimile message.

13. The system of claim 3 wherein the hostile packet switched network is the Internet and the inbound message is a facsimile message.

14. The system of claim 2 wherein the hostile packet switched network is the Internet and the inbound message is a voice message.

15. The system of claim 3 wherein the hostile packet switched network is the Internet and the inbound message is a voice message.

16. The method of claim 8 wherein the hostile packet switched network is the Internet and the inbound message is a voice message.

17. The method of claim 8 wherein the hostile packet switched network is the Internet and the inbound message is a facsimile message.

* * * * *